(12) United States Patent
Lee

(10) Patent No.: US 9,215,176 B2
(45) Date of Patent: Dec. 15, 2015

(54) METHOD OF DETERMINING PACKET PATH IN VLAN, AND VLAN SYSTEM USING ENERGY SAVING PATH

(71) Applicant: DASAN Networks, Inc., Seongnam-si, Gyeonggi-do (KR)

(72) Inventor: Sangsan Lee, Seongnam-si (KR)

(73) Assignee: DASAN NETWORKS, INC., Seongnam-si, Gyeonggi-do (KR)

( * ) Notice: Subject to any disclaimer, the term of this patent is extended or adjusted under 35 U.S.C. 154(b) by 187 days.

(21) Appl. No.: 13/919,199

(22) Filed: Jun. 17, 2013

(65) Prior Publication Data

US 2014/0362706 A1 Dec. 11, 2014

(30) Foreign Application Priority Data

Jun. 10, 2013 (KR) .................. 10-2013-0065930

(51) Int. Cl.
*H04L 12/803* (2013.01)
*H04L 12/751* (2013.01)
*H04L 12/46* (2006.01)

(52) U.S. Cl.
CPC .......... *H04L 47/122* (2013.01); *H04L 12/4641* (2013.01); *H04L 45/02* (2013.01)

(58) Field of Classification Search
CPC .................................................. H04L 12/4641
See application file for complete search history.

(56) References Cited

U.S. PATENT DOCUMENTS

2008/0304519 A1* 12/2008 Koenen et al. ................ 370/477
2012/0110393 A1* 5/2012 Shieh et al. .................... 714/48

* cited by examiner

*Primary Examiner* — John Blanton
(74) *Attorney, Agent, or Firm* — Paratus Law Group, PLLC

(57) ABSTRACT

A virtual local area network (VLAN) system that uses an energy saving path includes a terminal which data is input to and output from by a user, a first switch configured to connect the terminal to a network, and a plurality of second switches connected to the first switch to form a trunk link. When traffic load on at least one of the plurality of second switches is less than a lower threshold in a situation in which packets are transmitted using an such that the packets are concentrated on a specific path of the trunk link.

17 Claims, 7 Drawing Sheets

FIG. 3

| Condition | | Bits on the VLAN ID | | | | | | | | | | | VLAN No. |
|---|---|---|---|---|---|---|---|---|---|---|---|---|---|
| Original VLAN | 0 | 0 | 0 | 0 | 0 | 0 | 0 | 0 | 0 | 0 | 1 | 0 | VLAN 2 |
| | 0 | 0 | 0 | 0 | 0 | 0 | 0 | 0 | 0 | 0 | 1 | 1 | VLAN 3 |
| | 0 | 0 | 0 | 0 | 0 | 0 | 0 | 0 | 0 | 1 | 0 | 0 | VLAN 4 |
| | 0 | 0 | 0 | 0 | 0 | 0 | 0 | 0 | 0 | 1 | 0 | 1 | VLAN 5 |
| | 0 | 0 | 0 | 0 | 0 | 0 | 0 | 0 | 1 | 0 | 1 | 0 | VLAN 10 |
| | 0 | 0 | 0 | 0 | 0 | 0 | 0 | 1 | 0 | 1 | 0 | 0 | VLAN 20 |
| pVLAN (NORMAL) | D | D | 0 | 0 | 0 | 0 | 0 | 0 | 0 | 0 | 1 | 0 | VLAN 2 |
| | D | D | 0 | 0 | 0 | 0 | 0 | 0 | 0 | 0 | 1 | 1 | VLAN 3 |
| | D | D | 0 | 0 | 0 | 0 | 0 | 0 | 0 | 1 | 0 | 0 | VLAN 4 |
| | D | D | 0 | 0 | 0 | 0 | 0 | 0 | 0 | 1 | 0 | 1 | VLAN 5 |
| | D | D | 0 | 0 | 0 | 0 | 0 | 0 | 1 | 0 | 1 | 0 | VLAN 10 |
| | D | D | 0 | 0 | 0 | 0 | 0 | 1 | 0 | 1 | 0 | 0 | VLAN 20 |
| sVLAN (ENERGY SAVING) | 1 | 0 | D | D | D | D | D | D | D | D | D | D | VLAN 2 |
| | 1 | 1 | D | D | D | D | D | D | D | D | D | D | VLAN 3 |
| | 0 | 0 | D | D | D | D | D | D | D | D | D | D | VLAN 4 |
| | 1 | 0 | D | D | D | D | D | D | D | D | D | D | VLAN 5 |
| | 1 | 1 | D | D | D | D | D | D | D | D | D | D | VLAN 10 |
| | 1 | 1 | D | D | D | D | D | D | D | D | D | D | VLAN 20 |

METHOD OF DETERMINING PACKET PATH IN VLAN, AND VLAN SYSTEM USING ENERGY SAVING PATH

CROSS-REFERENCE TO RELATED APPLICATION

This application claims priority to and the benefit under 35 U.S.C. §119(a) of Korean Patent Application No. 2013-0065930, filed on Jun. 10, 2013, in the Korean Intellectual Property Office, the entire disclosure of which is incorporated herein by reference for all purposes.

BACKGROUND

1. Field

Hereinafter, a method of determining a packet path in a virtual local area network (VLAN) and a VLAN system using the method will be described.

2. Description of Related Art

With the introduction of the Internet, the information and technology (IT) industry using the Internet has grown very rapidly. Recently, as portable devices such as smart phones have been introduced, an Internet service market has expanded.

Internet equipment consumes energy, and energy consumption related to the Internet has sharply increased with the growth of the Internet service market. Thus, research has been conducted on an Internet network system that consumes less energy to expand the Internet market and network infrastructure.

Meanwhile, research has also been conducted into reducing energy consumption in a network system using the VLAN.

SUMMARY

In one general aspect, there is provided a method of determining a packet path in a virtual local area network (VLAN) using an energy-efficient Ethernet (EEE), the method including: determining a number of VLAN identifications (IDs) allocated to each of a plurality of switches, determining a switch having a largest number of VLAN IDs among the plurality of switches, as a root VLAN node, determining a lowest cost path from the root VLAN node to a switch belonging to the VLAN and allowing a switch to which an amount of packets transmitted decreases when the lowest cost path is determined, to enter a sleep mode of the EEE.

The method before the determining of the number of VLAN IDs, further includes determining whether path resetting is needed by comparing traffic load on each of the plurality of switches with a lower threshold, while an initial path of the VLAN is established, wherein when the traffic load is less than the lower threshold, the method proceeds to the determining of the number of VLAN IDs.

The method after the determining of the lowest cost path, further includes returning the lowest cost path to the initial path when traffic load on a switch belonging to the lowest cost path is compared with the lower threshold and the traffic load is determined to be greater than the lower threshold.

The traffic load comprises at least one among a buffer occupancy rate of the switch and a traffic state of the switch.

When the traffic load on at least one of the plurality of switches is determined to be less than the lower threshold, path resetting is determined to be needed in at least one VLAN identified with a VLAN ID allocated to the at least one switch.

When a plurality of the root VLAN nodes are present, the determining of the lowest cost path comprises dividing the plurality of switches into path groups in units of the plurality of VLAN nodes.

When a plurality of root VLAN nodes are present, The method further includes determining a lowest cost path between the plurality of root VLAN nodes using a spanning tree algorithm or an IEEE 802.1.D spanning tree protocol (STP).

In another aspect, there is provided a virtual local area network (VLAN) system using an energy-efficient Ethernet (EEE), the system including: a terminal which data is input to and output from by a user, a first switch configured to connect the terminal to a network; and a plurality of second switches connected to the first switch to form a trunk link, wherein when traffic load on at least one of the plurality of second switches is less than a threshold in a situation in which packets are transmitted using an initial path formed by the trunk link, the plurality of second switches set an aggregate path such that the packets are concentrated on a specific path of the trunk link.

After the plurality of second switches set the aggregate path, the plurality of second switches may return the trunk link to the initial path when traffic load on a switch belonging to the aggregate path among the plurality of second switches is greater than the threshold.

Among the plurality of second switches, a switch having a largest number of VLAN IDs is determined as a root VLAN node, and a lowest cost path from the root VLAN node to another switch belonging to the trunk link is determined to set the aggregate path.

When a plurality of root VLAN nodes are present, the plurality of second switches set a lowest cost path between the plurality of root VLAN nodes using a spanning tree algorithm or an IEEE 802.1.D spanning tree protocol.

The plurality of second switches each includes a special bridge protocol data unit (eBPDU) configured to calculate a lowest cost path using a spanning tree algorithm, and a switch that is not determined as to whether it belongs to the aggregate path calculates which port has lowest costs using the eBPDU, starting from a switch determined to belong to the root VLAN node or the aggregate path to the switch that is not determined as to whether as to whether it belongs to the aggregate path, and sets a path based on a calculation result.

BRIEF DESCRIPTION OF THE DRAWINGS

FIG. 3 is a table illustrating an example of VLAN identification (ID) regions used in a VLAN.

Figure 1:
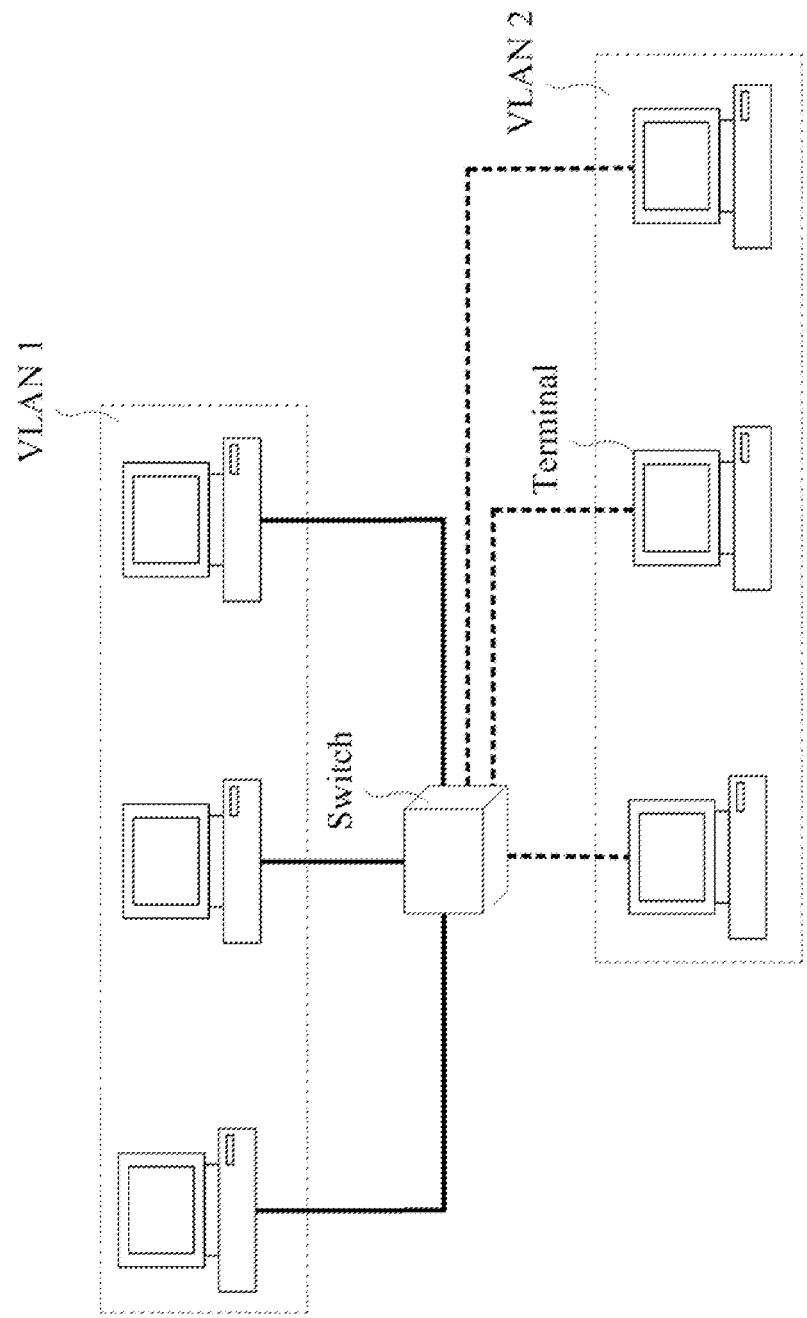
FIG. 1 schematically illustrates an example of the structure of virtual local area networks (VLANs).

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will suggested to those of ordinary skill in the art. Also, descriptions of well-known functions and constructions may be omitted for increased clarity and conciseness.

The presently described examples will be understood by reference to the drawings, wherein like parts are designated by like numerals throughout. The drawings are not necessarily drawn to scale, and the sizes and relative sizes of the layers and regions may have been exaggerated for clarity.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Before starting detailed explanations of figures, components that will be described in the specification are discriminated merely according to functions mainly performed by the components or conventionally carried out according to common knowledge of related technical fields. That is, two or more components which will be described later can be integrated into a single component. Furthermore, a single component which will be explained later can be separated into two or more components. Moreover, each component which will be described can additionally perform some or all of a function executed by another component in addition to the main function thereof. Some or all of the main function of each component which will be explained can be carried out by another component. Accordingly, presence/absence of each component which will be described throughout the specification should be functionally interpreted.

The present invention provides methods and apparatuses for saving energy in a network using a virtual local area network (VLAN). In the present disclosure, the inventor(s) of the present invention has named a general state in which a VLAN operates as a 'normal mode', and an energy saving state proposed in the present invention as an 'energy saving mode'.

According to the present invention, when traffic is low in a VLAN system, paths in which packets are delivered are aggregated to one path, thereby reducing the amount of packets to be input to some switches. The switches to which the amount of packets delivered decreases are switched to a sleep mode (or idle mode) used in the Energy-Efficient Ethernet (EEE), thereby reducing energy consumption in the network.

In the energy saving mode, various paths in which data/packets can be delivered are aggregated into some paths. Hereinafter, the inventor(s) of the present invention has named a path to which a plurality of paths are aggregated and in which packets are intensively transmitted, as an 'aggregate path'. In this case, switches are operated differently in the normal mode and the energy saving mode.

First, the VLAN will be briefly described. The VLAN provides logically different networks using physically connected network devices. The VLAN may be embodied using switch devices that form networks that are logically differentiated from one another. In each of the VLANs that are logically differentiated, different broadcast domains are present.

FIG. 1 schematically illustrates an example of the structures of VLANs. Referring to FIG. 1, a network is divided into a VLAN 1 and a VLAN 2, and a switch controls data to be exchanged only between computers (terminals) belonging to each of the VLANs.

When data/packets are delivered from a computer belonging to the VLAN 1 to the switch, the switch delivers the data/packets to only computers having the same VLAN identification (ID). The data/packets transmitted from the computer belonging to the VLAN 1 are not delivered to a computer belonging to the VLAN 2.

VLANs are classified into static VLANs and dynamic VLANs. In a static VLAN, each port is set manually. In a dynamic VLAN, a specific host connected thereto may be detected using VTMM (VLAN to MAC mapping) of each of end terminals. In the VTMM, a host is designated to logically belong to a specific VLAN.

The inventor(s) of the present invention has named a basic VLAN path that is set in the normal mode as a primary VLAN (pVLAN), and a VLAN path that is set in the energy saving mode as a saving VLAN (sVLAN), according to the present invention.

A switch is connected using a VLAN interface. The VLAN interface includes an access link and/or a trunk link.

The trunk link means a link via which a plurality of VLANs are connected to one another. The trunk link is compared with an access link via which a network node (switch) is connected to a host/terminal/server.

In the VLAN, one logical network is formed for each switch or each switch group including a plurality of switches that use a VLAN trunking protocol (VTP).

In general, a VLAN ID is assigned to each of ports on a trunk link of a switch. The VLAN ID enables a VLAN that is physically identified to be recognized as a LAN that is logically connected.

Figure 2:
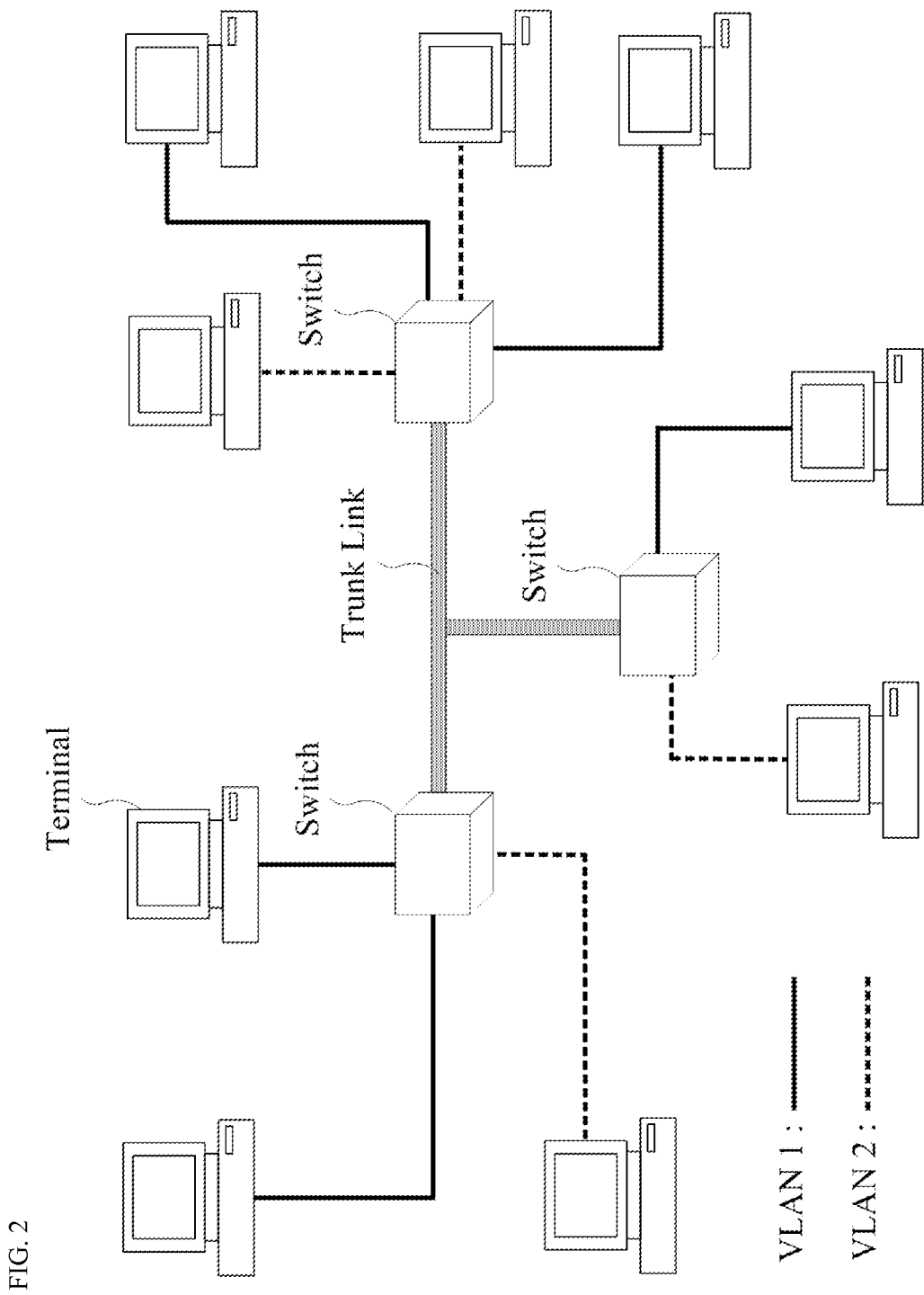
FIG. 2 illustrates an example of the structures of two VLANs using a common trunk link.

FIG. 2 illustrates an example of the structures of two VLANs using a common trunk link. As illustrated in FIG. 2, a VLAN system forms networks that completely or partially share network equipment but are logically different. Referring to FIG. 2, a VLAN 1 and a VLAN 2 use a common switch and a common trunk link but are separated from each other.

A VLAN is formed in a layer 2 network together with the Ethernet using a VLAN tag. The VLAN tag includes protocol ID, user priority, a canonical format indicator (CFI), and VLAN ID. The VLAN tag is located in an Ethernet header.

The VLAN tag is added to an Ethernet frame on the trunk link, and helps identify a packet passing through the trunk link. When the packet arrives at an end of a trunk interface, the VLAN tag is removed and the packet is then delivered to an appropriate access link.

According to the present invention, it is assumed that a network has conditions described below.

First, the network is a stochastic system. This means that traffic load may be generated in the network at different times and in different states. Second, each of hosts has beforehand belonged to a specific VLAN. Third, a network device is formed in a layer 2, and a network enters a sleep mode when traffic is low, similar to an energy-efficient Ethernet (EEE) or a green Ethernet. That is, it is assumed that the network is a system defined in the IEEE 803.3az.

The green Ethernet uses an access link but energy consumption in a network is saved using a trunk link according to the present invention.

An amount of energy consumed in a network device may be determined by the number of active layer 2 switches and the number of links on each device. The amount of energy $E_N$ consumed in a network may be expressed by Equation 1 below.

$$E_N = \sum_{1}^{i} Esw_i, \quad \text{[Equation 1]}$$

wherein $Esw_i$ denotes an $i^{th}$ switch belonging to a VLAN. The amount of energy consumed in a switch includes an amount of energy consumed in a processor and an amount of energy consumed in an interface. Thus, the amount of energy $E_N$ consumed in the network may be expressed by Equation 2 below.

$$E_N = \sum_{1}^{i} \left( p \cdot a + \sum_{1}^{k} l_k \cdot b \right)_i, \quad \text{[Equation 2]}$$

wherein 'p' denotes the amount of energy consumed in the processor, $l_k$ denotes the amount of energy consumed in a $k^{th}$ interface of the switch, 'a' denotes a coefficient representing a ratio of the amount of energy consumed in the processor to the amount of energy in the entire network, and 'b' denotes a coefficient representing a ratio of the amount of energy consumed in the interface to the amount of energy in the entire network.

The degree to which energy is saved in the network may be expressed by Equation 3 below.

$$E_S = E_N - Esw_{off}, \quad \text{[Equation 3]}$$

wherein $Esw_{off}$ denotes the energy of the network in which a specific switch enters the sleep mode, and $E_S$ denotes the amount of energy consumed in the entire network considering a state in which a specific switch is 'off'. As described above, in the EEE, when the amount of packets transmitted decreases to a predetermined level or less, a switch enters the sleep mode.

According to the present invention, the energy of the network $Esw_{off}$ is maximized to reduce network energy consumption.

Briefly, the present invention includes the following:
(1) A network is determined to operate in the normal mode or the energy saving mode. This process uses an Ethernet frame in which a VLAN tag is modified.
(2) A root VLAN node is determined. The root VLAN node is a node that is most active in the flow of traffic. The root VLAN node is a node corresponding to the root of a tree in the path through which data/packets flow.
(3) With respect to the root VLAN node, a lowest cost path group is determined. The lowest cost path group means a main path connected to the root VLAN node in the energy saving mode. Since a plurality of root VLAN nodes may be used, a plurality of lowest cost path groups may be present.

When a specific switch is powered off in the network, a path through which data/packets are transmitted may change. It is important to detect a path through which data/packets are delivered without using the switch that is powered off. An optimum path may be determined in consideration of traffic load, switch characteristics, network coverage limits, etc. A process of powering off a specific switch and detecting a new data/packet path may be performed in low traffic circumstances.

Although a node means a bridge or a switch in a network, the node will be hereinafter referred to as a 'switch'. Thus, in the present disclosure, a network device such as a switch should be understood as including a bridge.

Information based on which a network is determined to be operated in the normal mode or the energy saving mode uses a VLAN tag. The VLAN tag may be implemented in various ways but a part of a bit field in VLAN ID may be reused. Thus, the VLAN tag will be hereinafter described as being indicated in the bit field in the VLAN ID.

FIG. 3 is an example of a table illustrating VLAN identification (ID) regions used in a VLAN. FIG. 3(a) illustrates a basic VLAN ID region, FIG. 3(b) illustrates a VLAN ID region of a pVLAN, and FIG. 3(c) illustrates a VLAN ID region of an sVLAN. In FIG. 3, each of regions denoted by 'D' means 'don't care bits' that are not directly related to packet transmission. A switch may determine whether a current network is a pVLAN or an sVLAN, based on the 'don't care bits'. Thus, the 'don't care bits' will be referred to as ID bits. Referring to FIG. 3, the 2 most significant bits of the pVLAN are set as 'D', and the 10 least significant bits of the sVLAN are set as 'D'.

According to the present invention, least significant bits (LSBs) are used in the pVLAN which is a normal mode path, and most significant bits (MSBs) are used in the sVLAN which is an energy saving mode path.

Actually, LSB regions provide information regarding a network in the case of the pVLAN, and MSB regions provide information regarding a network in the case of the sVLAN. Referring to FIG. 3, the 12 least significant bits are used to set a path in the case of the pVLAN, and the 2 most significant bits are used to set a path in the case of the sVLAN. Although FIG. 3 illustrates that the sVLAN uses the 2 most significant bits, the present invention is not limited thereto. The sVLAN may use bits remaining after a path is set in the pVLAN.

The VLAN tag is $2_k$ bits. When k=12, the VLAN tag may be used to identify 4096 IDs. According to the present invention, $2^j$ sVLANs are designed using j most significant bits. Such an sVLAN may be treated as a conventional p VLAN in a network system. In this case, the sVLAN corresponds to $2^{k-j}$ pVLANs.

Accordingly, according to the present invention, a VLAN may be operated as a pVLAN and an sVLAN in two operating modes. LSBs of a VLAN tag are used in the normal mode, and MSBs of the VLAN tag are used in the energy saving mode.

In the pVLAN, a path is determined by a network administrator or a VTP-virtual trunking protocol similar to a general VLAN, whereas in the sVLAN, a packet path is dynamically determined based on energy saving conditions including various parameters.

The parameters used in the sVLAN include traffic load, link speed, switch ID, the number of VLANs, etc.

The pVLAN operates at a high traffic load, and the sVLAN operates at a low traffic load. The sVLAN is aimed at saving network energy in low traffic circumstances. In other words, when traffic load becomes lower than a predetermined level, at least one VLAN is converted from a pVLAN to an sVLAN in a network. The number of sVLANs may increase according to network traffic load and threshold.

Setting of Aggregate Path

An sVLAN sets an aggregate path based on parameter information present in MSBs in a VLAN tag. An algorithm based on which an aggregate path is set in a network to save energy is described below.

1. In a network, each of nodes (switches) detects the number of VLAN IDs allocated thereto. Each of the nodes counts the number of unique VLAN IDs at ports thereof, and creates a list of VLAN IDs. By counting the number of VLAN IDs, a node on which VLAN IDs are currently concentrated may be detected among the nodes.

2. A node to which a largest number of VLAN IDs are allocated in a network system is determined. The node to which the largest number of VLAN IDs are allotted acts as a main node (switch and switch ports) when traffic is high. This node is not very likely to be powered off in the network system. This node is referred to as a 'root VLAN node'. The root VLAN node corresponds to the root of a tree in a new aggregate path. A plurality of root VLAN nodes may be present when the same maximum VLAN IDS are allocated thereto.

3. Each of the nodes includes a special bridge protocol data unit (eBPDU). The eBPDU calculates which port of the node has lowest path costs to a node whose path is determined. If it is assumed that in a VLAN, all switches initially have default ID 'VLAN 1', a message containing a result of the calculation of the eBPDU (eBPDU message) is broadcast to the switches having the default ID 'VLAN 1'.

The eBPDU determines a path using a spanning tree algorithm including traffic load, link speed, switch ID, the number of VLANs, etc. The algorithm used to set a path by the eBPDU is the same as an algorithm employed by a BPDU.

4. The root VLAN node transmits a peer link message to first neighbor nodes directly connected thereto. The first neighbor nodes that receive the peer link message send an eBPDU packet advertising that a shortest path to the root VLAN node is known thereto, to the other nodes. Then, the first neighbor nodes transmit the peer link message to second neighbor nodes directly connected thereto, and the second neighbor nodes transmit the eBPDU packet advertising that the shortest path to the root VLAN node is known thereto, to other nodes. This process is repeatedly performed starting from the root VLAN node, until the other nodes have a path.

5. When a node receives eBPDU messages transmitted from different nodes via one port, a lowest cost path to a nearest root VLAN node may be determined using a spanning tree protocol (STP) according to the non-linear IEEE 802.1.D. An algorithm defined in the standards means costs for a given link speed. Thus, a lowest cost means a fastest link speed. Furthermore, a general STP may be used to select a path for saving energy.

6. Nodes having a VLAN ID to the nearest root VLAN node are connected based on the peer link message and the lowest cost path algorithm.

7. When a plurality of root VLAN nodes are present, all root VLAN nodes in the system are connected based on a lowest cost path. The lowest cost path is based on the algorithm suggested in the IEEE 802.1.D.

An aggregate path is set using the spanning tree algorithm or the STP of the IEEE 802.1.D. Information regarding an sVLAN is updated in all nodes. It is possible to detect a VLAN to which each of the nodes belongs using the VLAN ID allocated to the root VLAN node, based on this information.

In a network, an aggregate path may be set by traffic load. The setting of the aggregate path may be performed in two ways, based on two pieces of information stored in a node. First, a buffer occupancy rate of each of switches is used. Second, a broadcast traffic detected in a specific device at a certain point of time is used. The detected broadcast traffic is referred to as device traffic load (TL).

When actual traffic load $x_{Actual}$ is greater than a specific lower threshold $x_{LL}$ as in Equation 4, a network device performs a normal mode (pVLAN) operation.

$$x_{LL} \leq x_{Actual} \qquad \text{[Equation 4]}$$

However, in a network, a node (switch) uses an sVLAN allocated to ports thereof when the actual traffic load $x_{Actual}$ is less than the specific lower threshold $x_{LL}$ for a given time period $d_T$. That is, a network device starts the energy saving mode.

It is preferable that a pVLAN is slowly switched to an sVLAN and an sVLAN is rapidly switched to the pVLAN.

If a node (switch) in a path satisfies bottleneck conditions below (Relation 5), whether the sVLAN is to be used is determined by sVLAN parameters of a device in the path of the sVLAN.

$$(x_{UL} + x_{Bias}) < x_{Actual}, \qquad \text{[Equation 5]}$$

wherein $x_{UL}$ denotes an upper threshold, and $x_{Bias}$ denotes a value for setting a variable range to determine whether the sVLAN is to be selected. $x_{Bias}$ may not be used in some systems.

If Equation 5 is satisfied, a network is switched to the pVLAN starting from the sVLAN having highest traffic load. Then, the pVLAN processes its traffic load similar to a general VLAN.

The lower and upper thresholds described above may vary according to a network. Alternatively, one threshold may be used instead of the lower and upper thresholds.

A method of determining a packet path in a VLAN suggested in the present invention and a VLAN system 100 will now be summarized.

Figure 4:
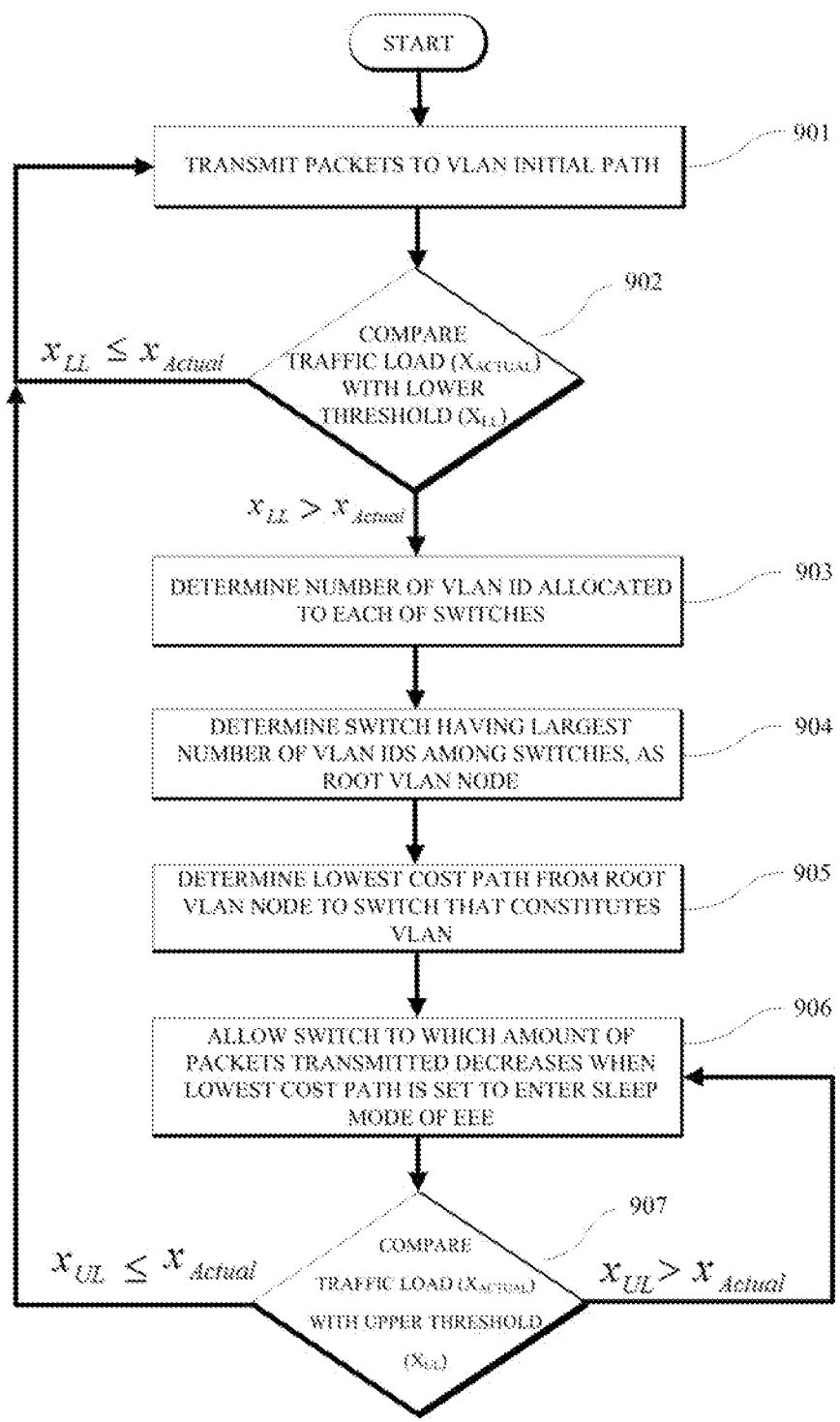
FIG. 4 is a flowchart illustrating an example of a method of determining a packet path in a VLAN.

FIG. 4 is a flowchart illustrating an example of a method of determining a packet path in a VLAN. Packets are transmitted in an initial VLAN path (operation 901). Then, when the energy saving mode is used, the number of VLAN IDs allocated to each of a plurality of switches is determined (operation 903). Then, a switch having a largest number of VLAN IDs among the plurality of switches is determined as a root VLAN node (operation 904), Then, a lowest cost path from the root VLAN node to a switch belonging to the VLAN is determined (operation 905). Then, a switch to which an amount of packets transmitted decreases when the lowest cost path is set enters a sleep mode of the EEE (operation 906).

The method of determining a packet path in a VLAN may further include determining whether path resetting is needed by comparing the traffic load on each of the plurality of switches with a lowest threshold, while the initial VLAN path is established, before the number of VLAN IDs is determined (operation 902). In this case, when the traffic load on each of the plurality of switches is determined to be less than the lowest threshold, the method proceeds to operation 903 in which the number of VLAN IDs is determined.

The method of determining a packet path in a VLAN may further include returning the lowest cost path to the initial VLAN path when the traffic load on each of the switches that constitute the lowest cost path is compared with an upper threshold and determined to be greater than the upper threshold, after the switches enters the sleep mode (operation 907). In FIG. 4, the upper threshold is determined without considering the value $X_{Bias}$ expressed in Equation 5.

When the traffic load on at least one of the plurality of switches is determined to be less than the lower threshold, path resetting of at least one VLAN identified with VLAN ID allocated to the at least one switch may be determined to be needed. When the traffic load on one of the plurality of switches is determined to be less than the lower threshold, path resetting may be performed on a VLAN having the switch in its path.

Alternatively, the VLAN system 100 may determine an energy saving path only when traffic loads on all switches that constitute a VLAN path are determined to be less then the lower threshold. Also, the VLAN system 100 may use the energy saving path only when traffic loads on a predetermined number or more of switches among the switches that constitute the VLAN path are determined to be less than the lower threshold.

The energy saving path may be set using the algorithm described above. When a plurality of VLAN nodes are present, the determining of the lowest cost path includes determining lowest cost paths for the plurality of respective VLAN nodes by the plurality of switches, respectively. Finally, a lowest cost path between the plurality of root VLAN nodes is determined using the spanning tree algorithm or the STP of the IEEE 802.1.D. A variable corresponding to costs of the lowest cost path includes at least one among traffic load, link speed, the number of VLANs, etc.

Figure 5:
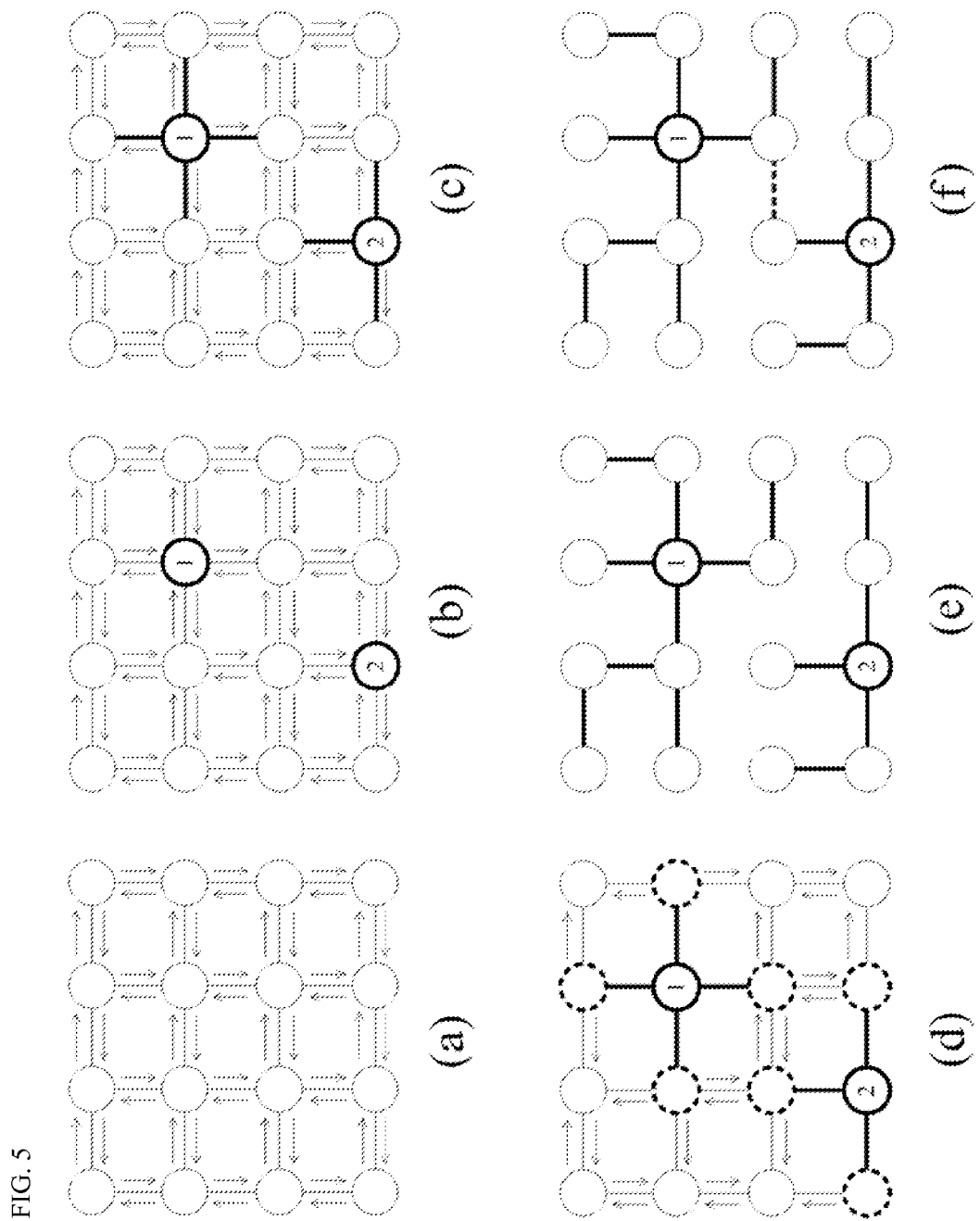
FIG. 5 illustrates an example of a case in which an aggregate path is set at a trunk link.

FIG. 5 illustrates an example of a case in which an aggregate path is set at a trunk link FIG. 5.

FIG. 5(*a*) illustrates a process in which switches that constitute the trunk link exchange a message advertising the number of initial VLAN IDs. FIG. 5(*b*) illustrates examples of two root VLAN nodes having a largest number of VLAN IDs. A root VLAN node 1 and a root VLAN node 2 are indicated by a thicker solid line than other nodes.

FIG. 5(*c*) illustrates a process in which the determined root VLAN nodes transmit a peer link message. When first neighbor switches directly connected to the root VLAN nodes receive the peer link message, a path that may connect the first neighbor switches to the root VLAN nodes is selected based on a lowest cost path calculated by an eBPDU.

FIG. 5(*d*) illustrates a process in which the first neighbor switches transmit the peer link message to other nodes. In FIG. 5(*d*), the first neighbor nodes that transmit the peer link message are indicated by dotted lines. The first neighbor switches do not need to transmit the peer link message to nodes whose paths have already been set.

Among other neighbor switches that receive the peer link message from the first neighbor switches, paths are set between lowest cost switches (second switches) and the first neighbor switches, based on lowest costs to arrive the first neighbor switches. Then, the second switches transmit the peer link message to other switches whose paths are not set.

When this process is repeatedly performed, all the switches have a path to the root VLAN nodes. FIG. 5(*e*) illustrates a state in which all the nodes have the path to the root VLAN nodes. A path formed by one root VLAN node is one lowest cost path group. Since the two root VLAN nodes are present, two lowest cost path groups are formed.

The two root VLAN nodes set a path by detecting a lowest cost path between the root VLAN nodes. By adding a path that connects the two root VLAN nodes, a path that connects all nodes is finally determined. FIG. 5(*f*) illustrates a state in which a path is set between the two root VLAN nodes. In FIG. 5(*f*), a path that connects the two lowest cost path groups is indicated with a dotted line.

Figure 6:
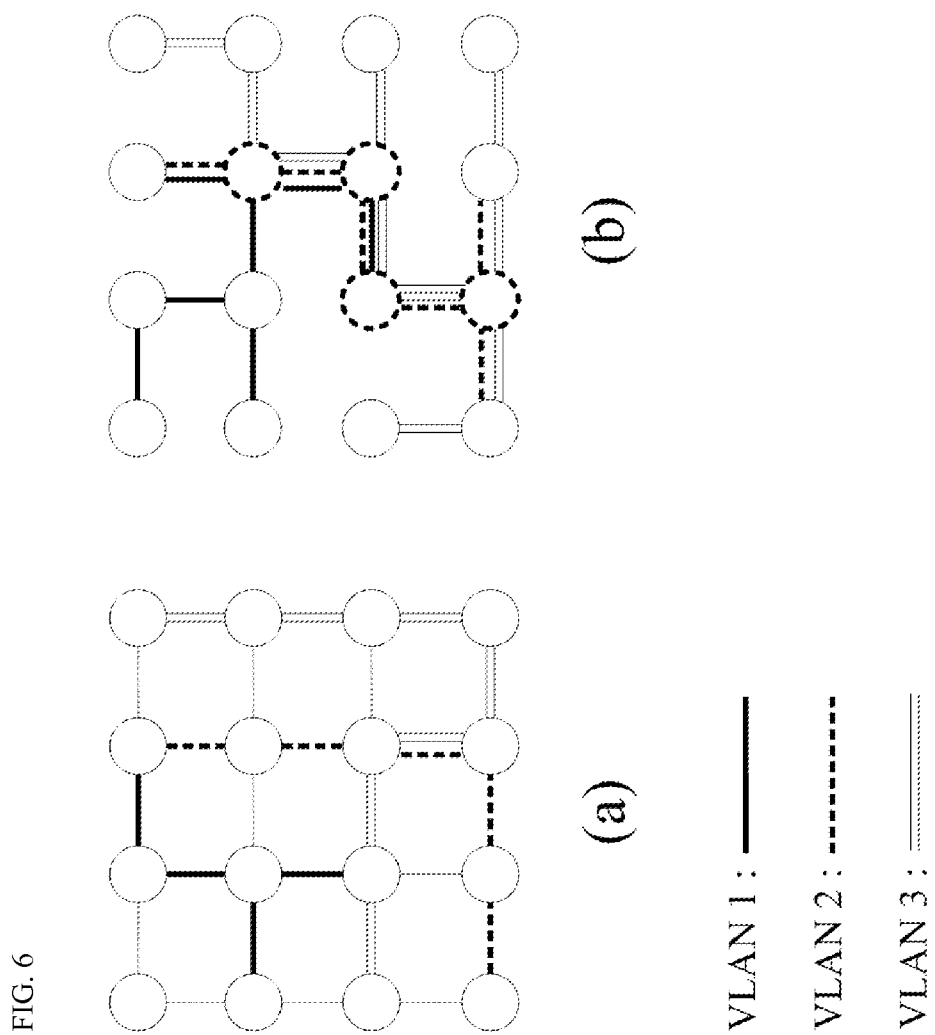
FIG. 6 illustrates an example of a trunk link in which a path is aggregated from a primary VLAN (pVLAN) to a saving VLAN (sVLAN)

FIG. 6 illustrates an example of a trunk link in which a path is aggregated from a pVLAN to an sVLAN. FIG. 6(*a*) illustrates trunk links for current three VLANs. The trunk link for a VLAN 1 is indicated by a thick solid line, the trunk link for a VLAN 2 is indicated by a thick dotted line, and the trunk link for a VLAN 3 is indicated with two solid lines.

FIG. 6(*b*) illustrates a case in which an aggregate path for the sVLAN is set according to the energy saving mode. The aggregate path in FIG. 6(*b*) is the same as that in FIG. 5. When the aggregate path is set, each of the VLANs 1 to 3 have a path that is different from an initial path thereof. Referring to FIG. 6(*b*), paths are concentrated at nodes indicated by a thick solid line. Thus, although an amount of packets transmitted to the nodes at which the paths are concentrated may be greater than before, packets are concentrated at specific nodes and an amount of packets transmitted to some nodes relatively decreases. The nodes (switches) to which the amount of packets transmitted decreases operate in the sleep mode of the EEE. Consequently, some of all nodes in a network operate in the sleep mode, thereby reducing energy consumption in the entire network.

Figure 7:
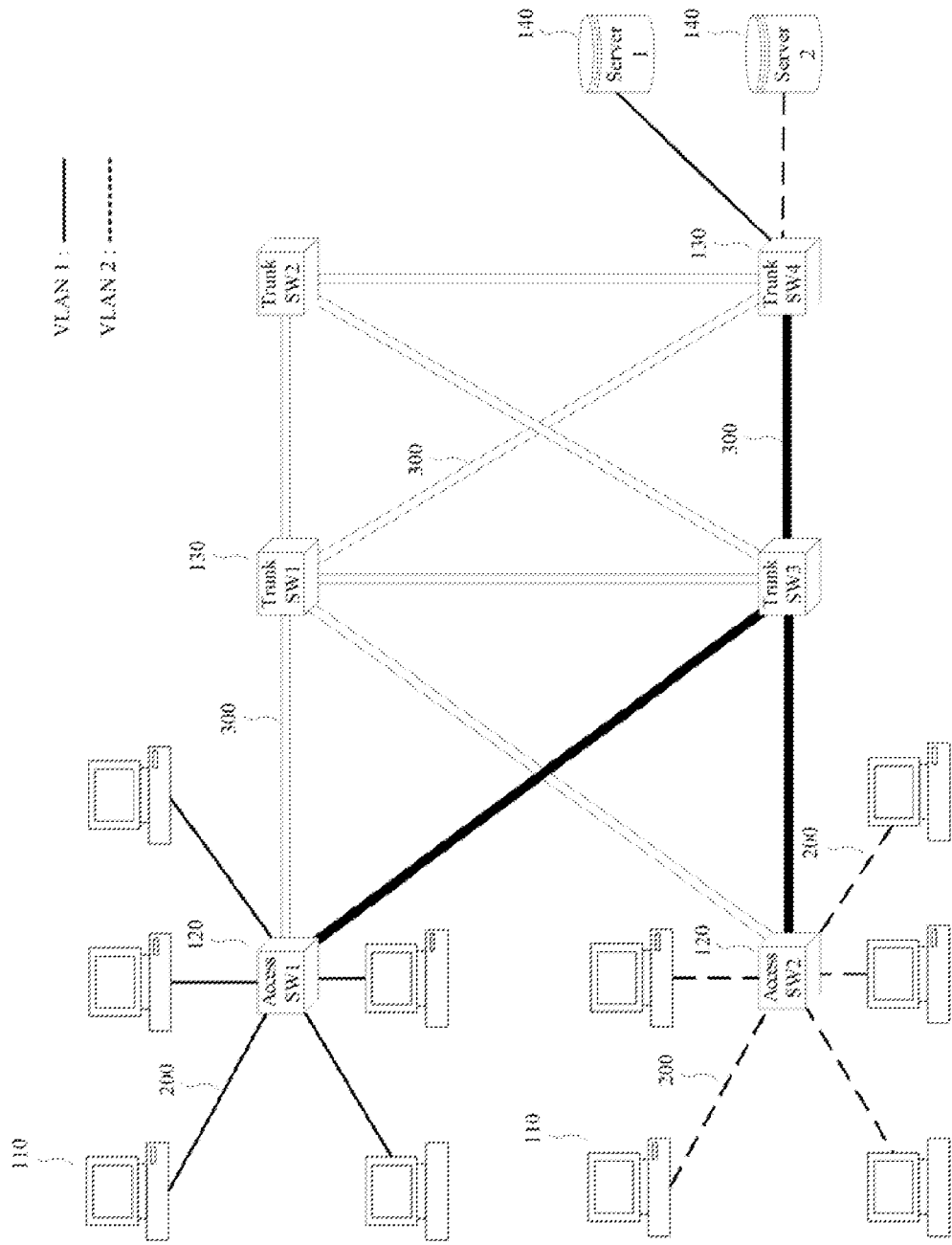
FIG. 7 illustrates an example of the structure of a VLAN system.

FIG. 7 illustrates an example of the structure of the VLAN system 100. The VLAN system 100 that uses an energy saving path includes terminals 110 which data is input to/output from by a user, first switches 120 that connect the terminals 110 to a network, and second switches 130 connected to the first switches 120 to form trunk links. The first switches 120 are illustrated as access switches Access SW, and the second switches 130 are illustrated as trunk switches Trunk SW.

Each of the first switches 120 forms an access link 200 with one of the terminals 110, and each of the second switches 130 forms a trunk link 300 with one of the first or second switches 120 or 130.

The trunk links 300 are connected to a first server 140 and a second server 140 that provide information to a VLAN 1 and a VLAN 2. In FIG. 7, parts indicated with a solid line denote a path of the VLAN 1, and parts indicated with a dotted line denote a path of the VLAN 2, except for the trunk links 300.

If traffic load on at least one of the second switches 130 is less than a lowest threshold when packets are transmitted using initial paths formed by the trunk links 300, the second switches 130 set an aggregate path such that packets are concentrated on a specific path among the trunk links 300 thereof.

In FIG. 7, some of the trunk links 300 are indicated with two solid lines and the other trunk links 300 are indicated with a thick solid line, wherein a path indicated with the thick solid line is an example of the aggregate path.

When traffic load on at least one of the second switches 130 is determined to be less than the lowest threshold, the second switches 130 set an aggregate path such that packets are concentrated on a specific path among the trunk links 300.

After the second switches 130 set the aggregate path, when traffic load on switches 130 that constitute the aggregate path among the second switches 130 is greater than an upper threshold, the second switches 130 may return the trunk links 300 to initial paths.

Here, the traffic load includes at least one of a buffer occupancy rate of and a traffic state of a switch.

Among the second switches 130, a switch having a largest number of VLAN IDs allocated is determined as a root VLAN node, and an aggregate path is set by determining a lowest cost path from the root VLAN node to another switch belonging to the trunk link 300.

When a plurality of VLAN nodes are present among the second switches 130, a lowest cost path group that includes different switches may be determined with respect to each of the plurality of VLAN nodes.

When a plurality of VLAN nodes are present among the second switches 130, a lowest cost path is set between the plurality of root VLAN nodes using the spanning tree algorithm or the STP of the IEEE 802.1.D.

The second switches 130 determine a lowest cost path using the spanning tree algorithm or the IEEE 802.1.D STP.

A variable corresponding to costs of the lowest cost path may include at least one among traffic load, link speed, the number of VLANs, etc.

Setting of an aggregate path has been described above in detail.

Although not shown, the second switches 130 each include an eBPDU configured to calculate a lowest cost path using the spanning tree algorithm. A switch whose belonging to an aggregate path is not determined calculates which port has lowest costs by using the eBPDU among ports of switches determined to belong to a root VLAN node or an aggregate path and switches that are not determined to belong to the root VLAN node or the aggregate path. A switch whose belonging to an aggregate path is not determined determines a lowest cost path to a switch among switches determined to belong to the aggregate path, based on the calculated lowest costs. This process has been described above in detail with reference to FIGS. 4 and 5.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of determining a packet path in a virtual local area network (VLAN) using an energy-efficient Ethernet (EEE), the method comprising:
   determining a number of VLAN identifications (IDs) allocated to each of a plurality of switches;
   determining a switch having a largest number of VLAN IDs among the plurality of switches, as a root VLAN node;
   determining a lowest cost path from the root VLAN node to a switch belonging to the VLAN; and
   allowing a switch to which an amount of packets transmitted decreases when the lowest cost path is determined, to enter a sleep mode of the EEE.

2. The method of claim 1, before the determining of the number of VLAN IDs,
   further comprising determining whether path resetting is needed by comparing traffic load on each of the plurality of switches with a lower threshold, while an initial path of the VLAN is established,
   wherein when the traffic load is less than the lower threshold, the method proceeds to the determining of the number of VLAN IDs.

3. The method of claim 2, after the determining of the lowest cost path, further comprising returning the lowest cost path to the initial path when traffic load on a switch belonging to the lowest cost path is compared with the lower threshold and the traffic load is determined to be greater than the lower threshold.

4. The method of claim 2, wherein the traffic load comprises at least one among a buffer occupancy rate of the switch and a traffic state of the switch.

5. The method of claim 2, wherein, when the traffic load on at least one of the plurality of switches is determined to be less than the lower threshold, path resetting is determined to be needed in at least one VLAN identified with a VLAN ID allocated to the at least one switch.

6. The method of claim 1, wherein, when a plurality of the root VLAN nodes are present, the determining of the lowest cost path comprises dividing the plurality of switches into path groups in units of the plurality of VLAN nodes.

7. The method of claim 1, when a plurality of root VLAN nodes are present, further comprising determining a lowest cost path between the plurality of root VLAN nodes using a spanning tree algorithm or an IEEE 802.1.D spanning tree protocol (STP).

8. The method of claim 1, wherein the determining of the lowest cost path comprises determining a lowest cost path from the root VLAN node to the switch belonging to the VLAN using a spanning tree algorithm or an IEEE 802.1.D spanning tree protocol (STP).

9. The method of claim 8, wherein a variable corresponding to costs of the lowest cost path comprises at least one among traffic load, link speed, and a number of VLANs.

10. A virtual local area network (VLAN) system using an energy-efficient Ethernet (EEE), the system comprising:
    a terminal which data is input to and output from by a user;
    a first switch configured to connect the terminal to a network; and
    a plurality of second switches connected to the first switch to form a trunk link,
    wherein when traffic load on at least one of the plurality of second switches is less than a threshold in a situation in which packets are transmitted using an initial path formed by the trunk link, the plurality of second switches set an aggregate path such that the packets are concentrated on a specific path of the trunk link,
    wherein among the plurality of second switches, a switch having a largest number of VLAN IDs is determined as a root VLAN node, and a lowest cost path from the root VLAN node to another switch belonging to the trunk link is determined to set the aggregate path.

11. The system of claim 10, wherein, after the plurality of second switches set the aggregate path, the plurality of second switches return the trunk link to the initial path when traffic load on a switch belonging to the aggregate path among the plurality of second switches is greater than the threshold.

12. The system of claim 10, wherein the traffic load comprises at least one of a buffer occupancy rate of the switch and a traffic state of the switch.

13. The system of claim 10, wherein, when a plurality of root VLAN nodes are present, the plurality of second switches determine a lowest cost path including different switches for each of the plurality of root VLAN nodes.

14. The system of claim 10, wherein, when a plurality of root VLAN nodes are present, the plurality of second switches set a lowest cost path between the plurality of root VLAN nodes using a spanning tree algorithm or an IEEE 802.1.D spanning tree protocol.

15. The system of claim 10, wherein the plurality of second switches determine the lowest cost path using a spanning tree algorithm or an IEEE 802.1.D spanning tree protocol.

16. The system of claim 15, wherein a variable corresponding to costs of the lowest cost path comprises at least one among traffic load, link speed, and a number of VLANs.

17. The system of claim 10, wherein the plurality of second switches each comprise a special bridge protocol data unit (eBPDU) configured to calculate a lowest cost path using a spanning tree algorithm, and a switch that is not determined as to whether it belongs to the aggregate path calculates which port has lowest costs using the eBPDU, starting from a switch determined to belong to the root VLAN node or the aggregate path to the switch that is not determined as to whether as to whether it belongs to the aggregate path, and sets a path based on a calculation result.

* * * * *